(12) United States Patent
Demangone et al.

(10) Patent No.: US 6,447,171 B1
(45) Date of Patent: Sep. 10, 2002

(54) MULTI-FIBER ARRAY CONNECTOR SYSTEM

(75) Inventors: Drew A. Demangone, Latrobe; Brian S. Trostle, York Springs; David H. Naghski, Lewisberry; Mark A. Mentzer, Lititz, all of PA (US)

(73) Assignee: FCI Americas Technology, Inc, Reno, NV (US)

( * ) Notice: Subject to any disclaimer, the term of this patent is extended or adjusted under 35 U.S.C. 154(b) by 0 days.

(21) Appl. No.: 09/497,381

(22) Filed: Feb. 4, 2000

(51) Int. Cl.$^7$ .............................. G02B 6/00; G02B 6/36; G02B 6/38
(52) U.S. Cl. ..................................................... 385/59
(58) Field of Search ............................ 385/59–75, 147

(56) References Cited

U.S. PATENT DOCUMENTS

| | | | | |
|---|---|---|---|---|
| 4,762,387 A | * | 8/1988 | Batdorf et al. ................. | 385/11 |
| 4,818,058 A | | 4/1989 | Bonanni ..................... | 350/96.2 |
| 4,830,456 A | * | 5/1989 | Kakii et al. ..................... | 385/59 |
| 4,973,127 A | * | 11/1990 | Cannon et al. ............... | 156/158 |
| 5,082,346 A | * | 1/1992 | Myers ........................... | 385/54 |
| 5,182,782 A | * | 1/1993 | Tabasky ........................ | 385/88 |
| 5,259,053 A | | 11/1993 | Schaffer et al. ................ | 385/88 |
| 5,287,425 A | | 2/1994 | Chang ........................... | 385/81 |
| B14,818,058 A | | 4/1995 | Bonanni ........................ | 385/71 |
| 5,430,819 A | * | 7/1995 | Sizer et al. .................. | 385/136 |
| 5,450,508 A | * | 9/1995 | Decusatis et al. .............. | 385/15 |
| 5,519,799 A | * | 5/1996 | Murakami et al. ............. | 385/66 |
| 5,546,281 A | | 8/1996 | Poplawski et al. ........... | 361/752 |
| 5,574,814 A | | 11/1996 | Noddings et al. .............. | 385/90 |
| 5,579,425 A | | 11/1996 | Lampert et al. ............... | 385/59 |
| 5,586,208 A | * | 12/1996 | Nishiyama .................... | 385/88 |
| 5,600,747 A | * | 2/1997 | Yamakawa et al. ........... | 385/59 |
| 5,613,024 A | | 3/1997 | Shahid ......................... | 385/52 |
| 5,619,604 A | | 4/1997 | Shiflett et al. ................. | 385/59 |
| 5,721,797 A | | 2/1998 | Basavanhally et al. ....... | 385/49 |
| 5,737,463 A | | 4/1998 | Weiss et al. ................... | 385/59 |
| 5,790,733 A | | 8/1998 | Smith et al. ................... | 385/88 |
| 5,815,623 A | | 9/1998 | Gilliland et al. .............. | 385/93 |
| 5,838,856 A | | 11/1998 | Lee .............................. | 385/54 |

\* cited by examiner

*Primary Examiner*—Akm E. Ullah
(74) *Attorney, Agent, or Firm*—Woodcock Washburn LLP

(57) ABSTRACT

An improved assembly for housing actively aligned VCSELs or detectors to a light transport terminal, such as a ferrule, and a method and technique for actively aligning VCSELs and laser detectors to a light transport terminal, such as a ferrule, are provided. The method actively aligns an array of VCSELs or laser detectors to a light transport terminal, such as a first ferrule. The aligned components can then be secured to a retainer housing which can receive a plug. Then a plug, having a second ferrule with V-groove alignment portions and a substantially rectangular housing encasing the second ferrule, can be inserted into the retainer housing, thereby passively aligning the array of optical fibers carried by the second ferrule of the plug to the array of optical fibers of the first ferrule by way of posts extending from the first ferrule into the V-grooves of the second ferrule. A VCSEL or detector to optical fiber plug assembly is thus provided.

6 Claims, 20 Drawing Sheets

MULTI-FIBER ARRAY CONNECTOR SYSTEM

BACKGROUND OF THE INVENTION

1. Field of the Invention

The present invention relates to optical fiber connectors for an array of optical fibers and more particularly to multi-fiber connectors aligned with a component such as a transceiver.

2. Brief Description of Prior Developments

Due to the increasing need for higher capacity data and voice transmission, use of optical fiber arrays is becoming necessary in many applications. Optical fibers, or light guides, are utilized to transmit data encoded in the form of light i.e., electromagnetic radiation from the ultraviolet, visible-light, and infrared portions of the spectrum. The quality of data transmitted in this manner is dependent upon minimizing signal and intensity losses along the transmission path. Intensity losses in the transmitted light signal can substantially degrade the quality of the data encoded in the signal e.g., by decreasing the strength of the signal beyond the sensitivity of a light detector. In some cases, such losses can render the data unrecoverable.

Misalignment of the various junctions along the signal-transmission path is a common source of signal intensity loss. For example, misalignment between the termination point of an optical fiber and an adjacent portion of the signal path will typically produce a signal loss. Hence, a terminal for an optical fiber should position the fiber so as to allow an end of the fiber to be precisely aligned with an adjacent portion of the signal-transmission path. In particular, the signal-transmission axis of the optical fiber i.e., fiber's longitudinal axis, should be positioned coincident with the signal-transmission axis of the adjoining portion of the signal-transmission path. While important for even single fibers, the possibility for misalignment increases when dealing with an array of fibers.

Alignment of such fiber arrays either with other arrays or with optical components can be troublesome, since the diameter of the core of these fibers is generally very small. For example, multi-mode fibers typically have a core with a diameter of about 62.5 microns. For these fibers, misalignment in any radial direction by more than about 10 microns can result in significant degradation of the optical signal being transmitted via the optical fiber. Aligning single mode fibers can be an even more difficult task since the core of typical single mode fiber is about 8 microns in diameter. Even a small degree of misalignment, e.g. 0.1 to 1 micron, for single mode fibers can result in significant degradation of the optical signal being transmitted via the optical fiber.

Maintaining precision alignment is an issue not only in the initial assembly of the receptacle portion of an optical connector, but also in the design of the receptacle to maintain alignment throughout the operating temperature range and in the presence of mechanical forces resulting from vibration, connection or pulling of the receptacle. It is important to align the various light transport elements of a receptacle assembly and it is important to align light sources and detectors to their corresponding transport means. Edge emitting lasers have previously been aligned with a laser transport element by placing an optical fiber proximate to the edge-emitting laser source, and then placing the other end of the fiber, or array of fibers as the case may be, in a ferrule which is then aligned with corresponding fibers of the laser transport element.

Vertical Cavity Surface Emitting Lasers (VCSELs) have recently emerged as a successful technology for generating encoded light signals, and for some applications have replaced edge emitting lasers. Using epitaxially-grown Bragg mirrors to form the laser cavity, the optical output of the VCSEL is emitted vertically from the surface. The VCSEL structure can lead to a host of performance advantages over conventional semiconductor lasers such as very small size for a single longitudinal mode optical output, very low power consumption, mode-hop free wavelength tunability, and two-dimensional array capabilities.

In contrast to conventional edge-emitting semiconductor lasers, the VCSEL has a radially symmetric Gaussian near-field, which enhances coupling to various optical components or fiber orientations. In addition, VCSEL technology allows the fabrication of two-dimensional laser arrays and the generation of smaller beam divergence.

It is advantageous to provide a way to actively align or couple a VCSEL, or an array of VCSELs, to an optical fiber, or array of optical fibers for inclusion into a light transport assembly. Since VCSELs are a relatively recent technology, the uses and assemblages for VCSELs have yet to be fully explored.

SUMMARY OF THE INVENTION

The invention meets the above needs by providing an improved assembly for housing actively aligned VCSELs or detectors to a light transport terminal, such as a ferrule, and a method and technique for actively aligning VCSELs and laser detectors to a light transport terminal, such as a ferrule. The method actively aligns an array of VCSELs or laser detectors to a light transport terminal, such as a first ferrule. The aligned components can then be secured to a retainer housing which can receive a plug. Then a plug, having a second ferrule with V-groove alignment portions and a substantially rectangular housing encasing the second ferrule, can be inserted into the retainer housing, thereby passively aligning the array of optical fibers carried by the second ferrule of the plug to the array of optical fibers of the first ferrule by way of posts extending from the first ferrule into the V-grooves of the second ferrule. A VCSEL or detector to optical fiber plug assembly is thus provided.

These and other features and objects of the present invention are set forth in the following description.

DETAILED DESCRIPTION OF THE DRAWINGS

The apparatus assembly and method of the present invention are further described with reference to the accompanying drawings in which.

Figure 20:
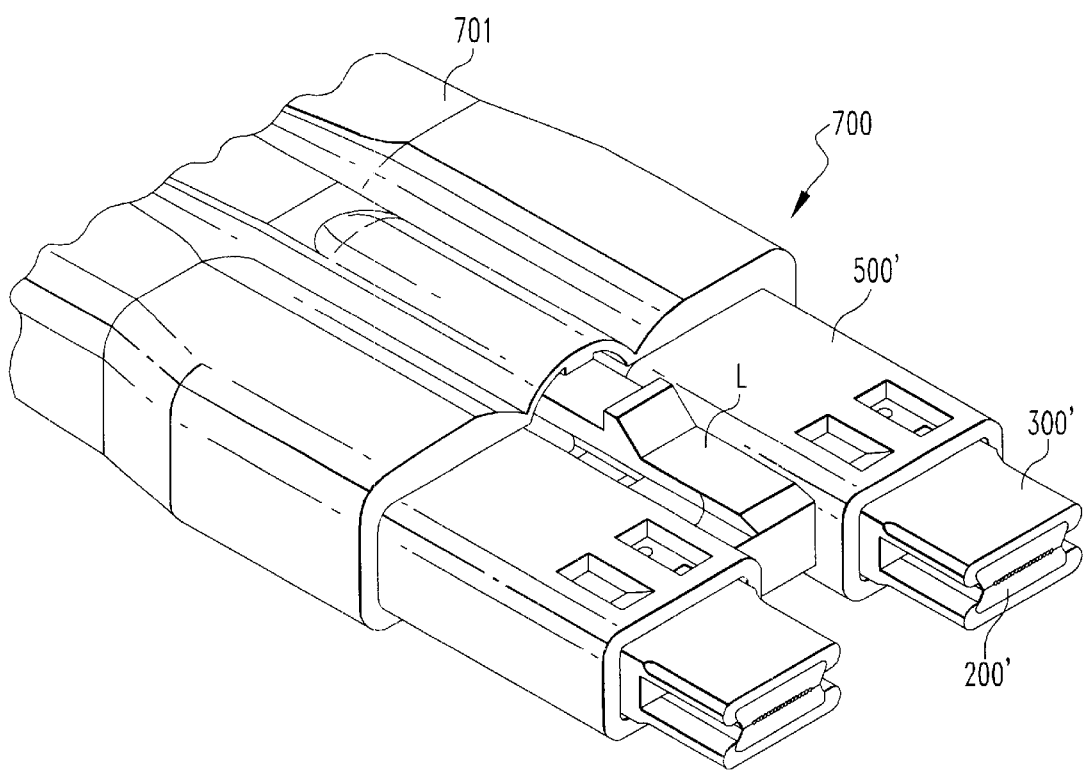

FIG. 20 displays a detailed view of the plug portion of an alternative embodiment of cable assembly of the present invention.

Figure 21:
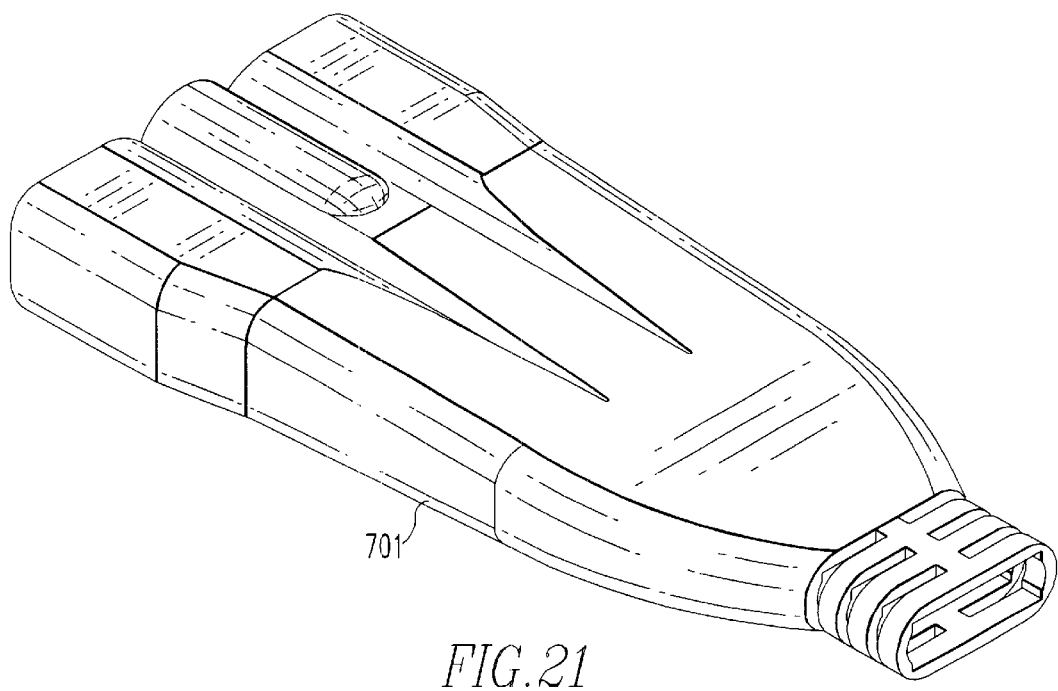

FIG. 21 displays a boot portion of an alternative embodiment of the cable assembly in accordance with the present invention.

DETAILED DESCRIPTION OF PREFERRED EMBODIMENTS

The present invention provides a method for actively aligning light transmitters, receivers or transceivers, such as VCSELs and laser detectors, to a light transport terminal, such as a ferrule, and an improved assembly for housing actively aligned VCSELs or detectors to a light transport terminal, such as a ferrule. Presently preferred embodiments of the method and apparatus assembly of the present invention are further described with reference to FIGS. 1 through 21.

Figure 1:
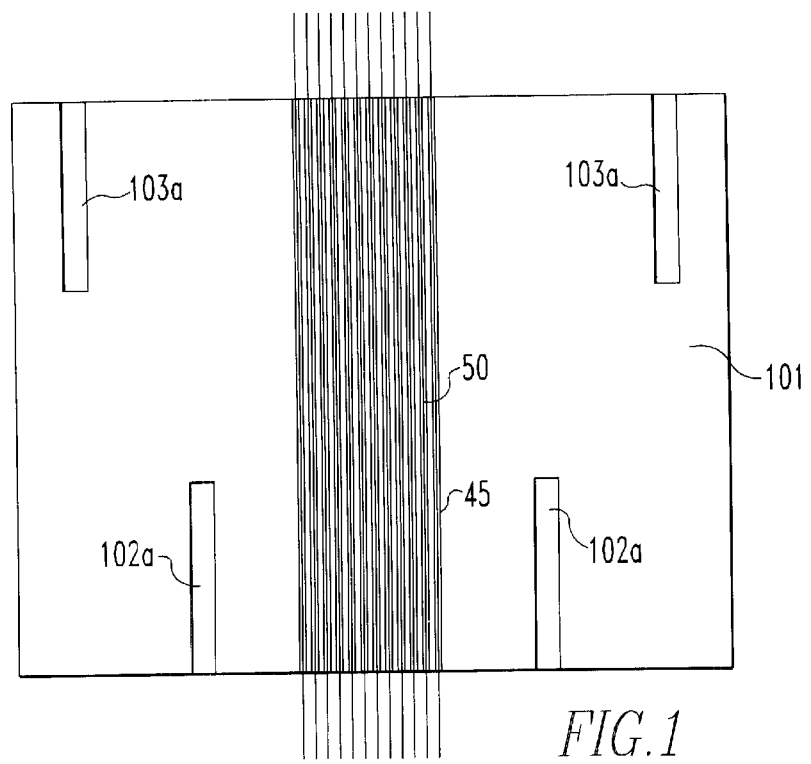
FIG. 1 is an illustration of optical fibers resting in grooves of a first coupler element in accordance with the present invention.

FIG. 1 is an illustration of a first coupler element in accordance with the present invention. A first coupler 101, or first light transport element, generally consists of two halves 101a and 101b (only one coupler half 101a is shown). Preferably, halves 101a and 101b are substantially symmetrical and identical, and have twelve grooves formed therein for an array 45 of twelve optical fibers. Array 45 is suited to certain computer applications, wherein eight lines serve as a bus, one line serves as a clock, and several lines serve to carry redundant data for confirmation or in case of a data loss. However, any number of optical fibers and grooves could be employed with the present invention. Thus, although a preferred embodiment is described with respect to an array of twelve aligned signal carriers, any number can be used within the scope and spirit of the present invention.

First coupler element half 101a, made of silicon etched according to conventional techniques, has an array of grooves 45 for receiving an array of optical fibers. Other materials, such as plastic or suitable semiconductive material formed by a variety of techniques, could be used. The first coupler element 101a also has a pair of grooves 102a and a pair of grooves 103a which form half of a passageway for a post to extend from the first coupler of the present invention. An array 50 of twelve optical fibers rests in the array of grooves 45.

Figure 2:
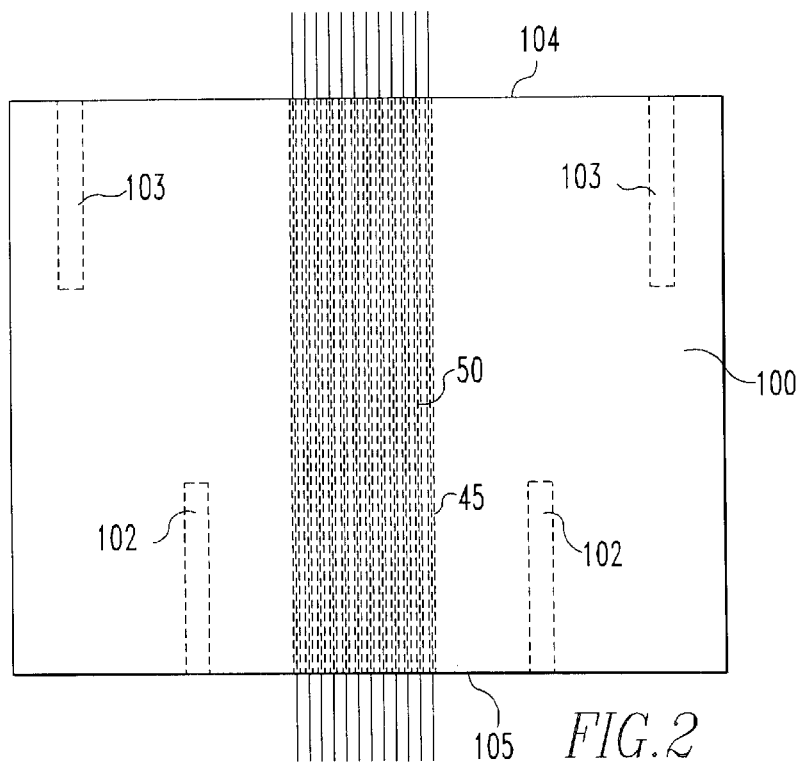
FIG. 2 is an illustration of optical fibers sandwiched in a first coupler in accordance with the present invention.

As shown in FIG. 2, once the array 50 of twelve optical fibers is resting in the array of grooves 45, another first coupler element 101b can be placed on top, with adhesive or other bonding techniques, ultimately securing the first coupler elements 101a and 101b together and fixing the optical fibers in place, to form first coupler 100. However, at this stage, no adhesive is yet placed in the passages 102 and 103 formed by opposing groove pairs 102a and 103a (shown in greater detail in FIG. 4).

Figure 3:
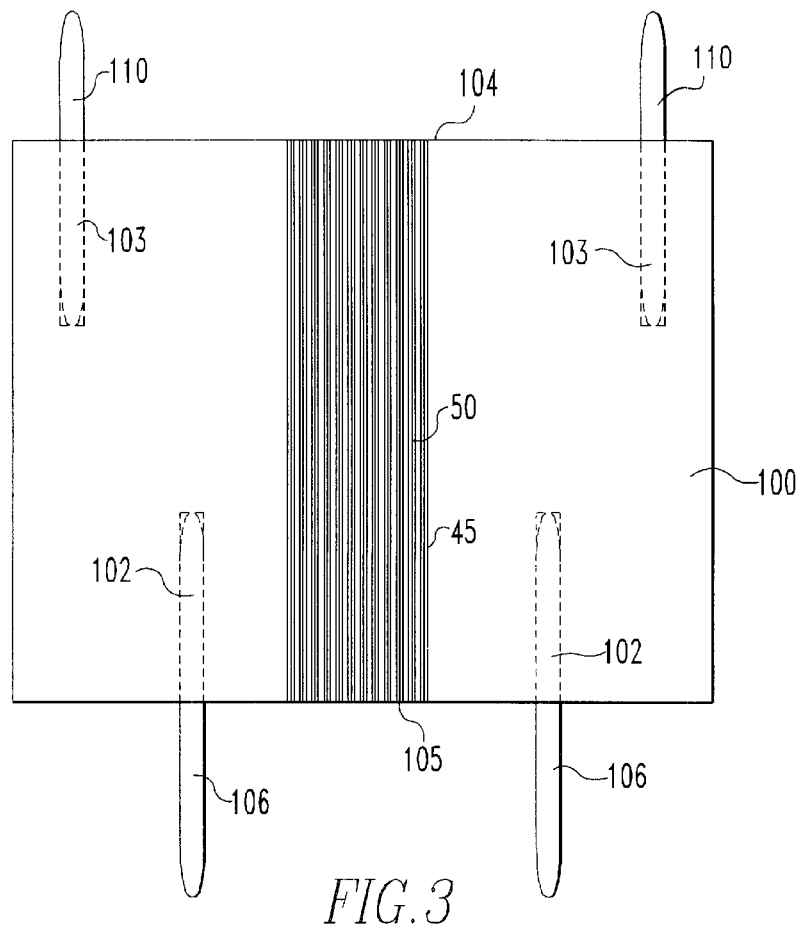
FIG. 3 is an illustration of a first coupler with posts extending therefrom in accordance with the present invention.

As shown in FIG. 3, the ends of the optical fibers have been sheared proximate to surfaces 104 and 105. Then, a polishing apparatus (not shown) polishes the fibers and the surfaces 104 and 105 of the first coupler element 100 to a very flat and smooth surface. It is important that a flat, smooth surface be created since, otherwise, alignment might be skewed unnecessarily by an angled fiber or angled surface. Since no particular polishing apparatus or method is necessary i.e., since any method for polishing the ends of optical fibers will suffice, no further description will be given here.

Once the fibers and surfaces 104 and 105 are polished, adhesive can be injected into the pairs of passageways 102 and 103 (which now form a hexagonal well), and a post can be inserted therein to be secured by the adhesive. The hexagonal well provides four points of contact to posts 106. As shown in FIG. 3, posts 106 and 110 extend from coupler 100 in accordance with the present invention. The insertion of posts 106 and 110 additionally serves to spread adhesive to other parts of the interface of first coupler elements 101, not previously covered with an adhesive. Any additional adhesive that might leak back out to surface 104 or 105 should be removed, to keep the surfaces 104 and 105 clean and polished. A neck, or reduced diameter portion of the post adjacent surfaces 104, 105 (not shown) prevents adhesive from exiting coupler elements 101.

Figure 4:
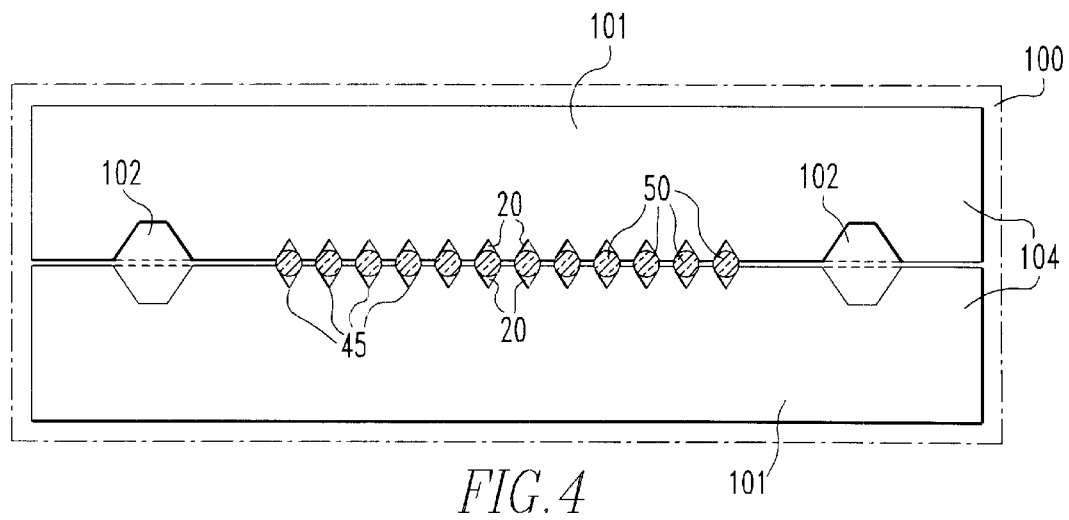
FIG. 4 is a side view illustration of a first coupler in accordance with the present invention.

As shown in FIG. 4, grooves 102 have a preferred trapezoidal shape, although this shape is not intended to be limiting. For example the grooves 102 (and 103) could have a triangular, rectangular, semicircular shape, and the like. In a preferred embodiment, having suitability to a type of optical fiber, an angle formed by one of the grooves 45 to the surface of element 101 is 54.74°.

Figure 5:
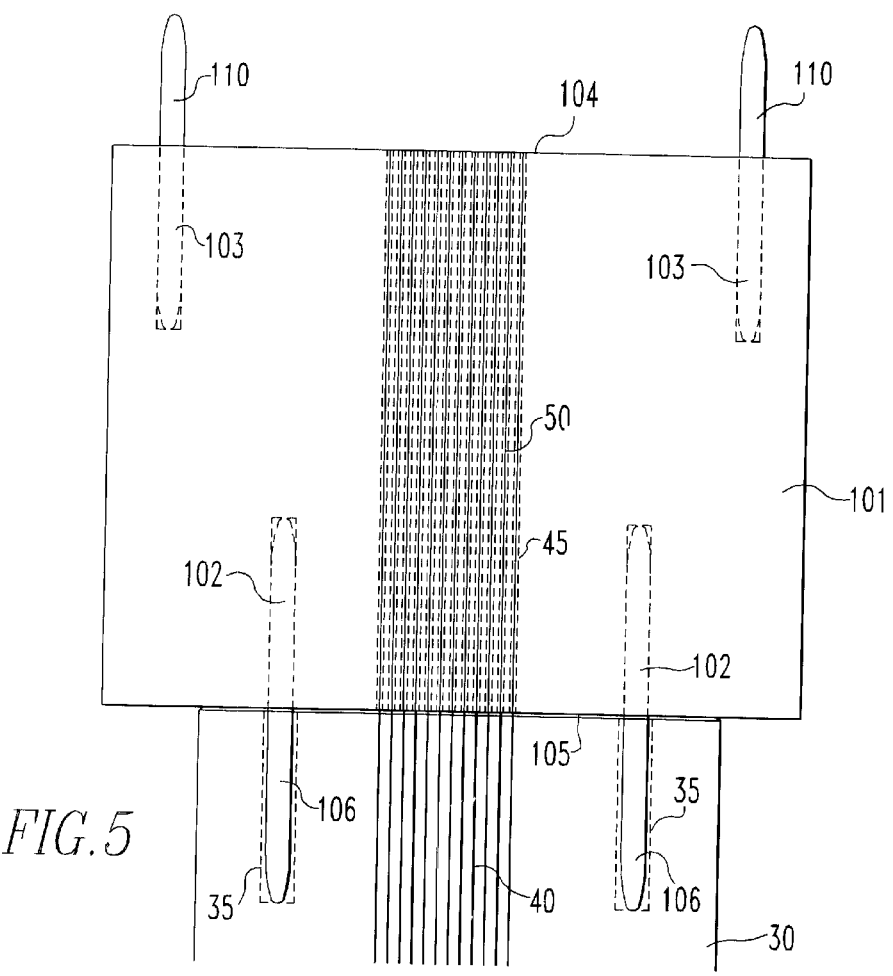
FIG. 5 is an illustration of a passive alignment of an array of laser coupler components with an array of optical fibers sandwiched in a first coupler in accordance with the present invention.

As shown in FIG. 5, once coupler 100 is assembled, it can be aligned with an element 30, such as an element having an array of laser components 40. Initially, a gross passive alignment is achieved by the insertion of posts 106 into passageways 35 of element 30. This brings the array of laser coupler components 40 into approximate alignment with the optical fiber array 50 of the first coupler 100.

However, as described previously, in the case of laser components, such as VCSELs or laser detectors, optimum alignment requires precision beyond passive alignment. FIGS. 6A through 6E illustrate a method for actively, precisely aligning an array of laser components with an array of optical fibers sandwiched in a first coupler 100 in accordance with the present invention.

Figure 6A:
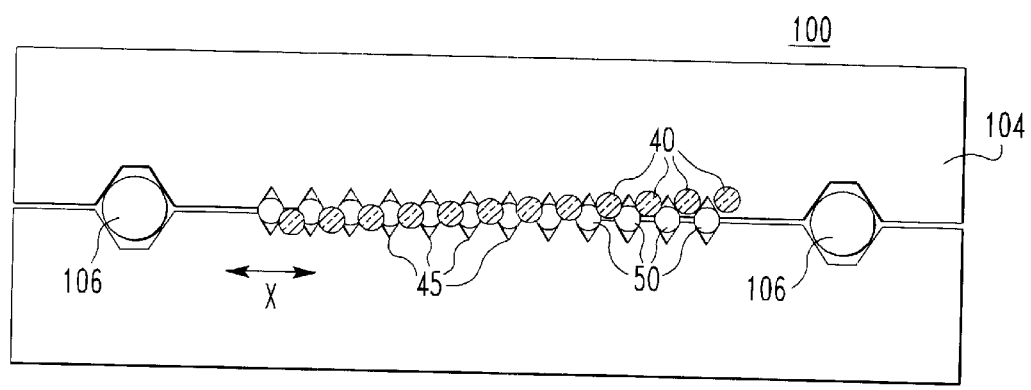
FIGS. 6A through 6E illustrate an active alignment of an array of laser coupler components with an array of optical fibers sandwiched in a first coupler in accordance with the present invention.

FIG. 6A shows the array of laser coupler components 40 in an initial approximate alignment with the optical fiber array 50 of the first coupler 100, caused by the passive gross alignment posts 106. However, as shown in an exaggerated fashion, the array of laser components 40 is not precisely aligned with the array of optical fibers 50. Further, although the posts 106 provide a gross alignment of the element 30 with the first coupler 100, some movement still can be effected between the two elements because the post/passageway structure allows for some relative movement. A machine capable of producing precise mechanical movement and positioning is now utilized to provide more precise alignment of coupler 100 and element 30 in a single iteration or through multiple iterations (e.g. to allow for any manufacturing tolerances of the fixtures). Since machines capable of precise multi-axis movement and positioning are presently available and since no particular machine is required in order to practice the invention, no further description of the machine will be provided other than necessary descriptions of its operation.

Figure 6B:
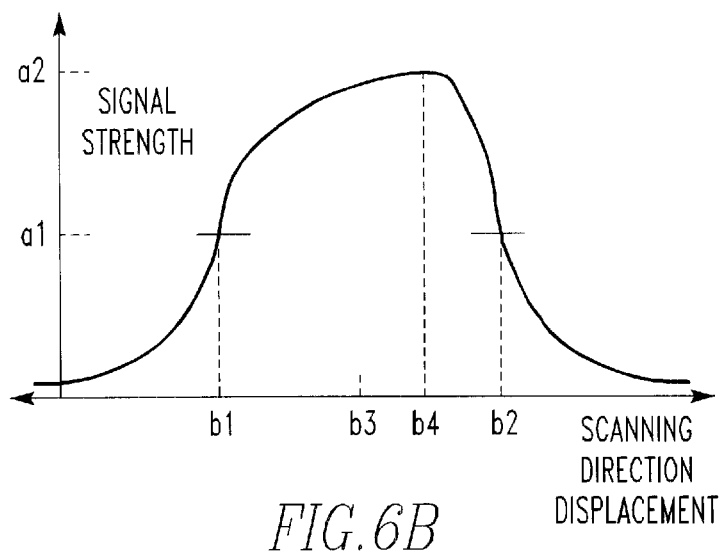

It is preferred for the machine to be operatively coupled to move element 30 relative to the first coupler 100. As desired, first coupler 100 could be fixed relative to element 30, along the plane containing surface 104; element 30 is fixed relative to coupler 100; or both element 30 and coupler 100 can move. In this embodiment, the machine coupled to element 30 is first directed to find an optimal position of a first end laser component along the X-axis as shown in FIG. 6A. The optimal alignment position can be determined as follows with reference to FIG. 6B. The optimal position is chosen as the mid-point between two positions on the curve in FIG. 6B. The positions could be defined in a range of between approximately 25–75% of peak. As specifically shown in FIG. 6B, the positions could be 50% of peak. Thus, in the case of FIG. 6A, the array of laser components 40 is moved laterally along the X-direction while light transmittance (in terms of signal strength) is measured. The graph of FIG. 6B shows the graphical interpretation of that measurement. Initially, when the laser component is grossly aligned by posts 106, relatively little light may make it through the optical fiber, but as the position of the laser component comes closer and closer to overlapping with the corresponding optical fiber, more and more signal strength transmitted through the fiber is detected. Then, as the laser component passes over the corresponding optical fiber, light transmittance begins to decrease once again. FIG. 6B displays such a condition.

In accordance with the present invention, there is a position where the signal strength, or light transmittance, was at a maximum. This position is denoted b4 in the graph of FIG. 6B having a signal strength, or light transmittance, of a2. A determination is made, by monitoring the signal strength of light being transmitted through the fiber at one end of the array, as to the X-axis position where the desired signal strength positions occurred. In FIG. 6B, these positions are at half-maximum and are reflected by b1 and b2 having signal strength a1, where a1=a2/2. Lastly, the optimal position is chosen as b3, the midpoint between positions b1 and b2 i.e., b3=(b1+b2)/2. The reason that b4 may not be defined as the optimal position is that sometimes a system environment can not be completely controlled, or imperfections might be associated with components. A spike in the data may occur yielding a maximum that does not correctly reflect a maximum in reality, or a component may have an imperfection causing the maximum to occur at somewhere other than the true center of the component. Thus, taking the midpoint of the two half-maximum points is a way of accounting for possible imperfections in the process, thereby yielding more stable results. It is noted that signal strength can be measured in a variety of ways, and can be interpreted in as many different ways. For example, the power of a signal can be used, logarithmic or exponential functions of a signal strength, and the like can also be used.

Figure 6C:
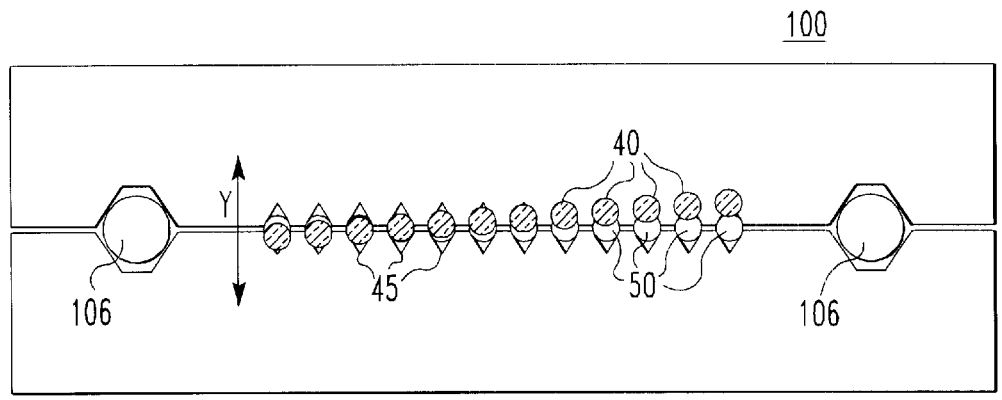

Thus, an optimal position is determined along the X-axis. The array of laser components 40 is moved to that position so that the fiber at one end of array 45 is aligned with the laser component 40 located at the corresponding end of the array of laser components, as shown in exaggerated fashion in FIG. 6C. In a like manner, an optimal position is determined along the Y-axis as shown in FIG. 6C. The aligning machine scans the fiber at the end of array 45 along the Y-axis, and determines the midpoint between the two half-maximum signal strength points, which generally corresponds to the center of the laser component.

Figure 6D:
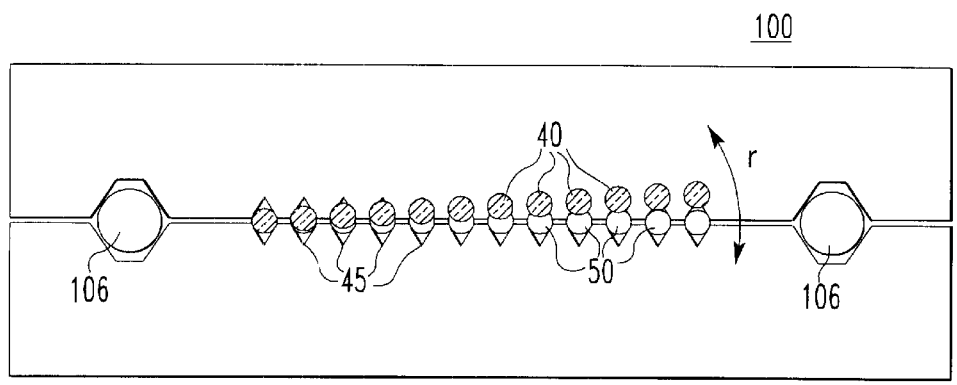
Figure 6E:
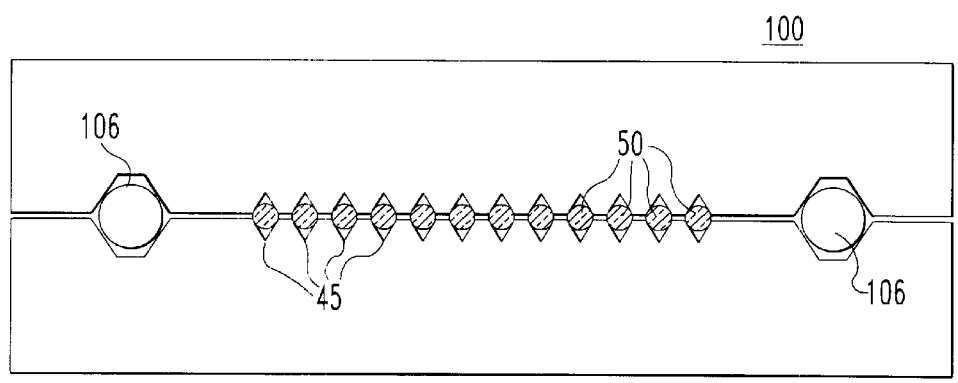

As shown in FIG. 6D, once the Y-axis position has also been determined, the aligning machine is caused to move array 40 in accordance with that position, thereby aligning and relatively fixing the first end laser component of array 40. It should be noted that the Y-axis could also be aligned before the X-axis, and that any two non-parallel axes could be used for alignment, although generally orthogonal axes provide the most beneficial alignment information. Next, the other end component is aligned. In this instance, the aligning machine moves the unaligned end laser component along an arc defined by the circle having the aligned end laser component as a center and the distance between the two end components as the radius. A light transmittance scan is performed as described with respect to FIG. 6B, and an optimal alignment position is determined. As before, this is the midpoint on the arc between the two half-maximum signal strength positions. Once this optimal position is determined along the arc, the unaligned end laser component of array 40 is moved to that position while maintaining the aligned position of the other end laser component, as shown in FIG. 6E. At this point, the component 30 is secured to the first coupler 100, by adhesive or other appropriate securing means, to maintain the alignment achieved by the active alignment method of the present invention. Determining optimal position with fibers on opposite ends of the array (i.e. fibers furthest apart from each other) provides the most discernible misalignment and the greatest possible accuracy.

Figure 7A:
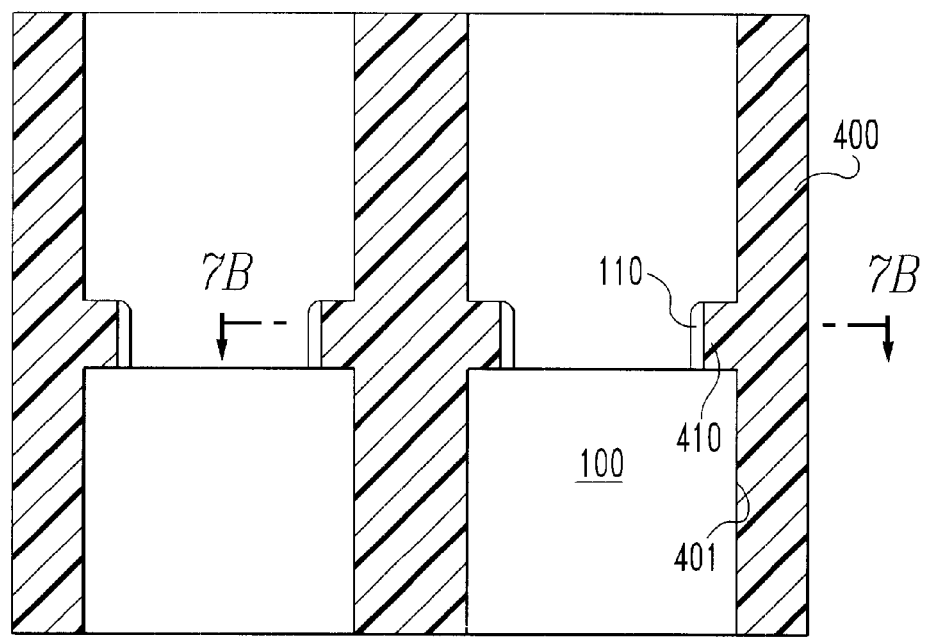
FIG. 7A is an illustration of a receptacle housing having received a first coupler in accordance with the present invention.
Figure 7B:
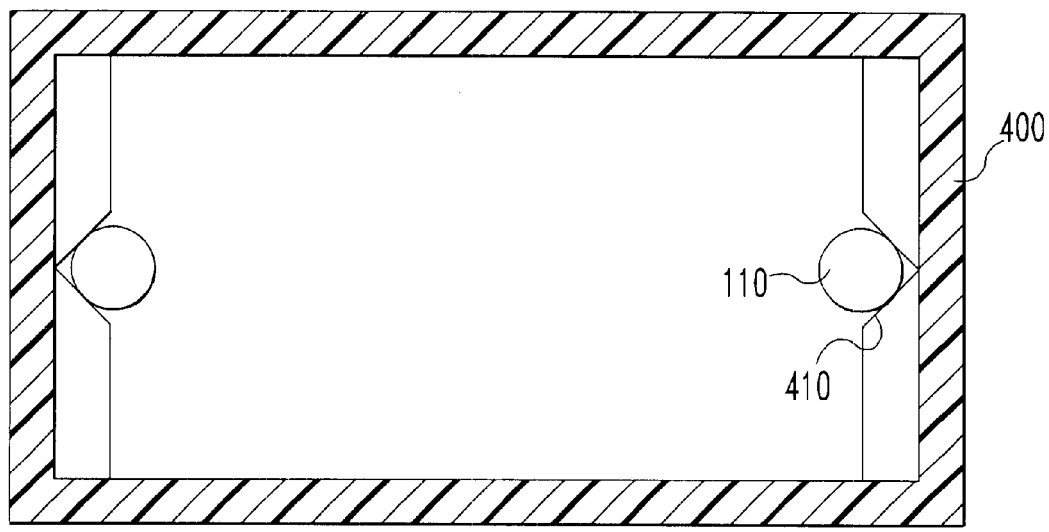
FIG. 7B is a cross-sectional view of the receptacle housing of FIG. 7A taken along line 7B—7B in accordance with the present invention.

FIG. 7A is an illustration of a receptacle housing 400 constructed in accordance with the present invention. As illustrated, regions 401 are crafted to retain the first coupler 100 of the present invention. Recessed portions 410 (shown in greater detail in FIGS. 18 and 22) receive a part of the posts 110 of the first coupler 100 of the present invention. In particular, a part of posts 110 abut semicircular or V-grooved portions 410 of the receptacle housing 400. An assembly is provided having two channels for the transmission of optical data along two different fiber arrays (one fiber acting as a transmit and the other array acting as a receive), but it should be understood that any number of channels could be implemented by repeating the methods and geometries of the present invention. FIG. 7B is a cross-sectional view of the receptacle housing of FIG. 7A taken along line 7B—7B, and shows in greater detail the abutment of posts 110 against V-grooved portions 410.

Figures 8A, 8B:
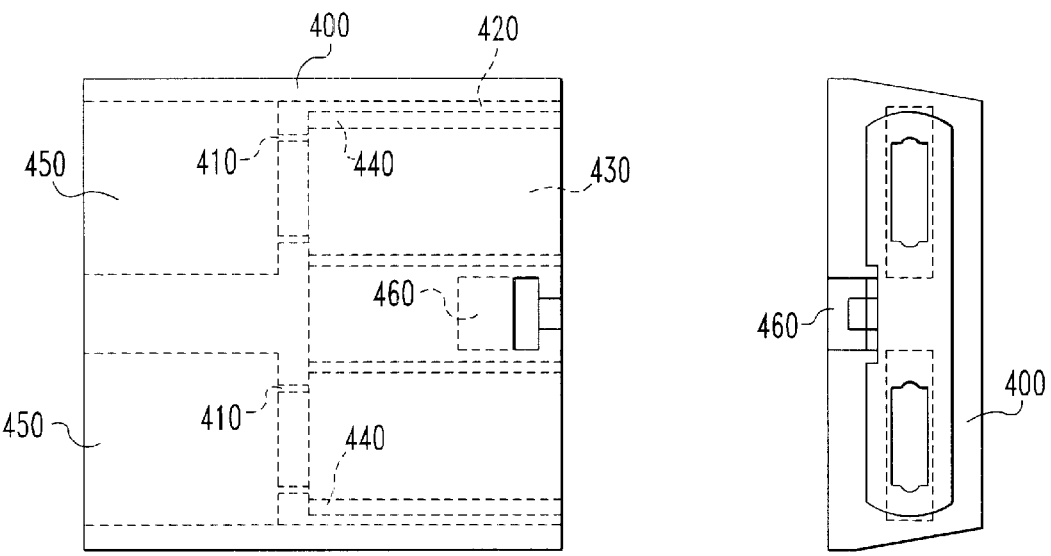
FIGS. 8A through 8D are illustrations of a preferred embodiment of a receptacle housing in accordance with the present invention.
Figure 8C:
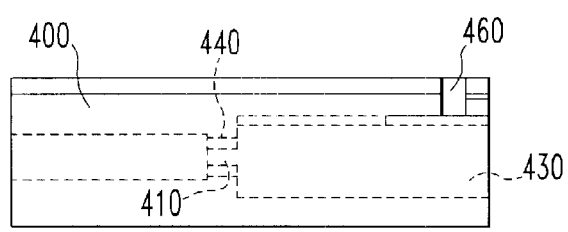
Figure 8D:
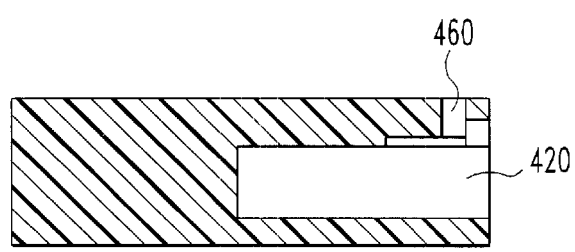

FIGS. 8A through 8D are illustrations of a preferred embodiment of a receptacle housing 400 in accordance with the present invention. Receptacle housing 400 includes regions 450 for receiving a first coupler, regions 410 for abutting posts, regions 430 for receiving a plug on a fiber optic cable assembly, regions 420 for receiving a second coupler housing positioned within the plug, regions 440 for receiving a second coupler within the plug to be passively aligned with the first coupler, and a securing means 460 for securing the receptacle housing 400 the plug. FIG. 8D is a side view of the receptacle housing 400, showing the plug receiving portion 430 and securing means 460, such as an RJ-style latching arrangement in accordance with the preferred embodiment of the present invention.

Figure 9:
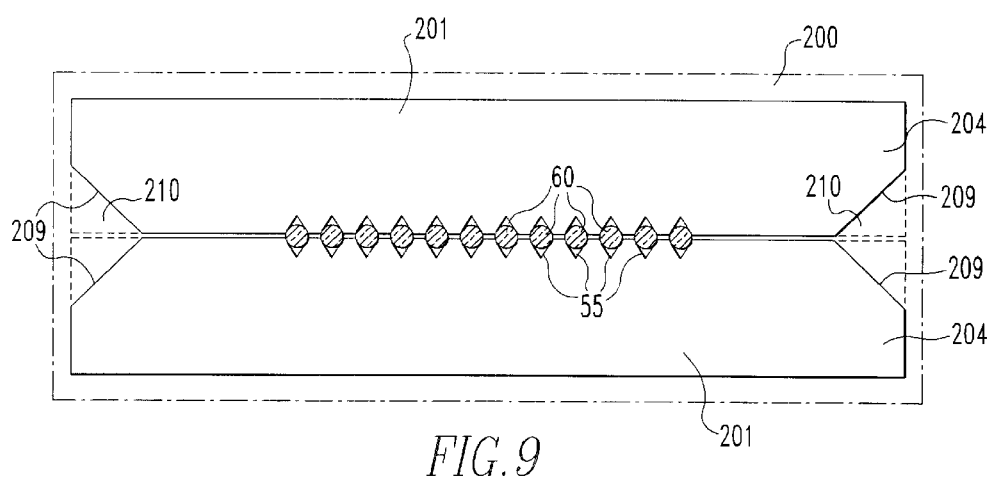
FIG. 9 is a side view illustration of a second coupler in accordance with the present invention.

FIG. 9 is an illustration of a second coupler element constructed in accordance with the present invention. As with the first coupler, the second coupler comprises two coupler elements 201, which in a preferred embodiment are symmetrical and identical, each forming half of the second coupler. A second coupler element 201 has an array of twelve grooves 55. In addition, the second coupler element 201 has tapered regions 209 that form the basis for V-grooves of the second coupler. Tapered regions 209 oppose one another such that when placed together, a V-groove is formed. An array of optical fibers 60 is shown resting on an array of grooves 55. The second coupler 200 is formed when second coupler elements are placed together with conventional adhesive or other securing means. V-grooves 210 formed by tapered regions 209 are also shown. As with the first coupler, the optical fibers are sheared and the face 204 of the second coupler 200 is polished to a flat and smooth surface.

Figure 10A:
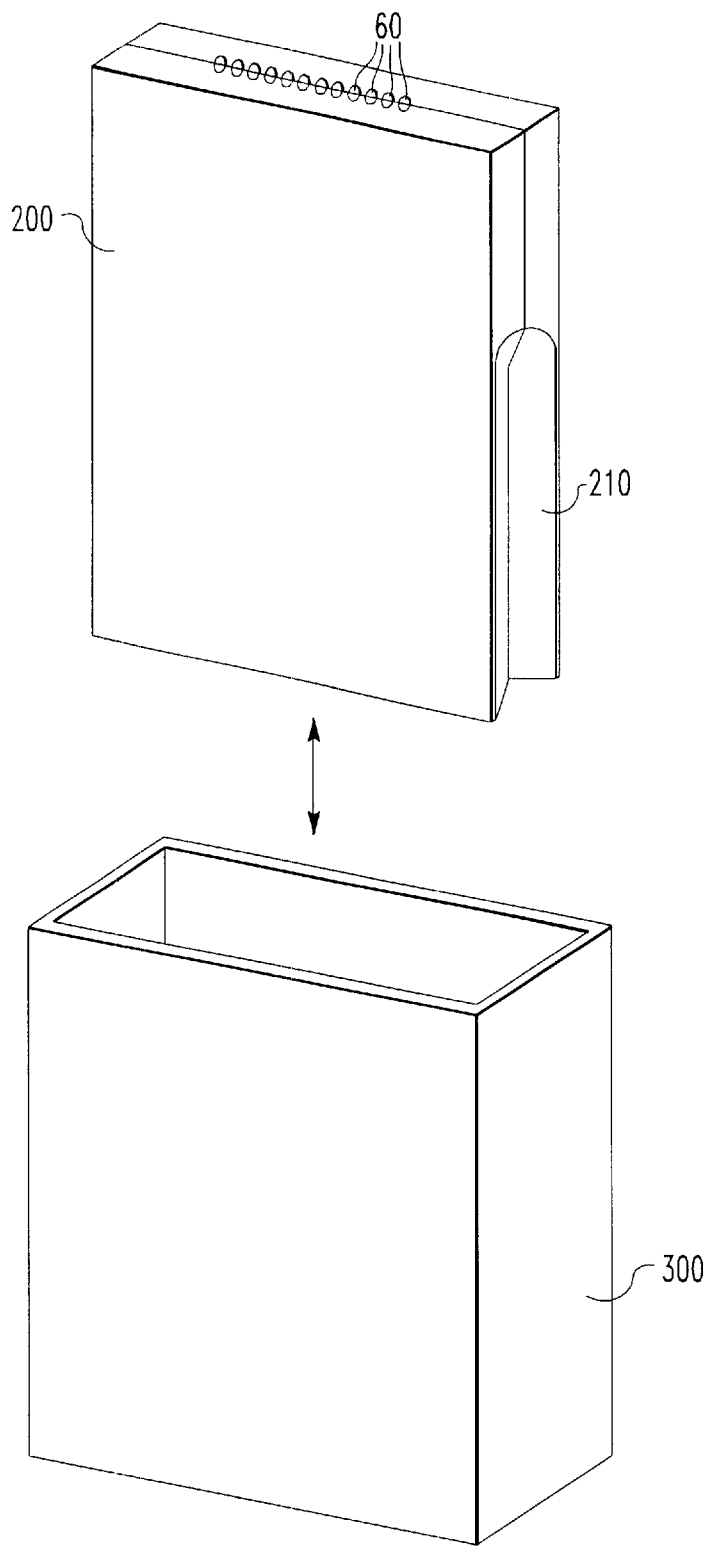
FIGS. 10A through 10D are illustrations of a second coupler housing for surrounding a second coupler in accordance with the present invention.
Figure 10B:
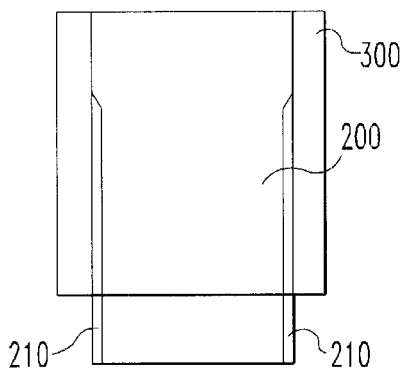
Figure 10C:
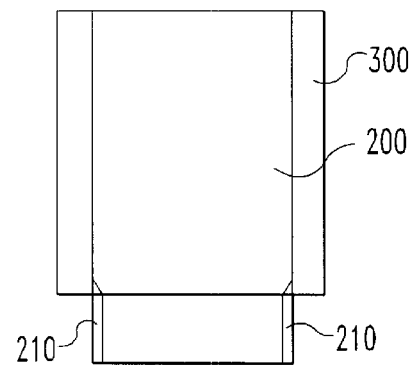
Figure 10D:
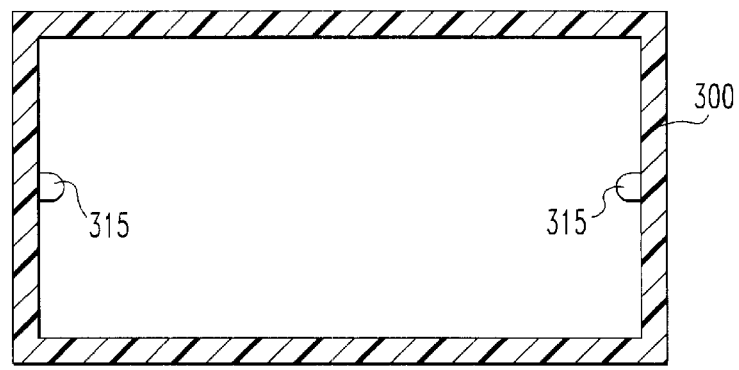

FIGS. 10A through 10D show a second coupler housing 300 for surrounding second coupler 200. Housing 300 has mechanical stops 315 (e.g., as shown in the cross section of FIG. 10D) in an interior section to engage a portion of V-grooves 210 of coupler 200 for retention. Housing 300 can also have mechanical stops (not shown) for retention in a corresponding feature (not shown) in plug 500. FIGS. 10B and 10C show separate embodiments of housing 300 surrounding second coupler 200 wherein V-grooves 210 can be of different lengths depending upon the posts 110 and receptacle housing 400 geometry.

Figure 11A:
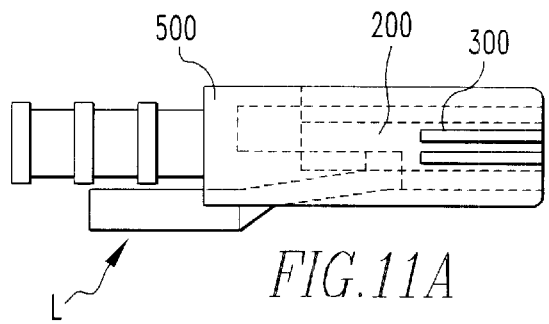
FIGS. 11A through 11C are illustrations of a preferred embodiment for a plug for retaining a second coupler housing and second coupler in accordance with the present invention.
Figure 11B:
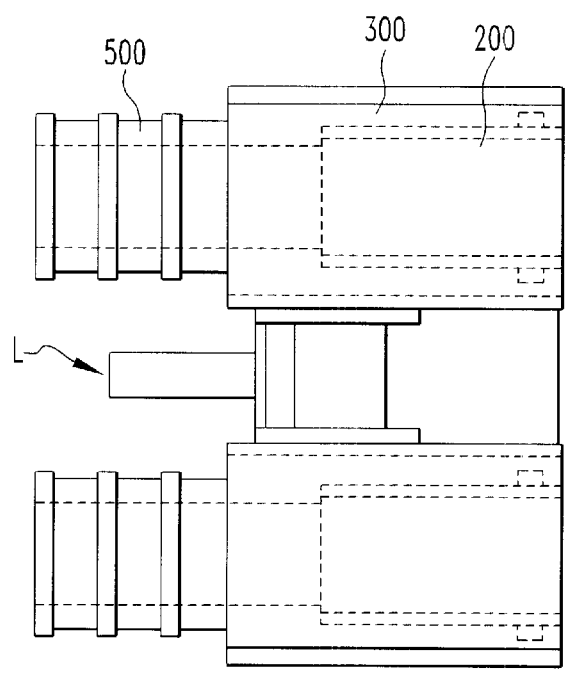
Figure 11C:
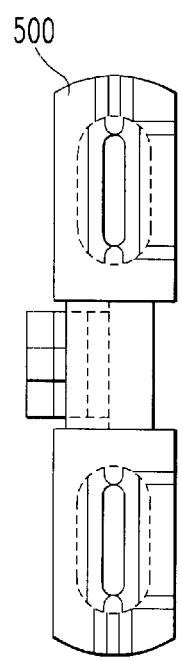

FIGS. 11A through 11C illustrate a preferred embodiment of a fiber optic cable assembly plug for retaining a second coupler housing and second coupler in accordance with the present invention. As shown, plug 500 retains a second coupler housing 300 surrounding a second coupler 200.

Figure 12:
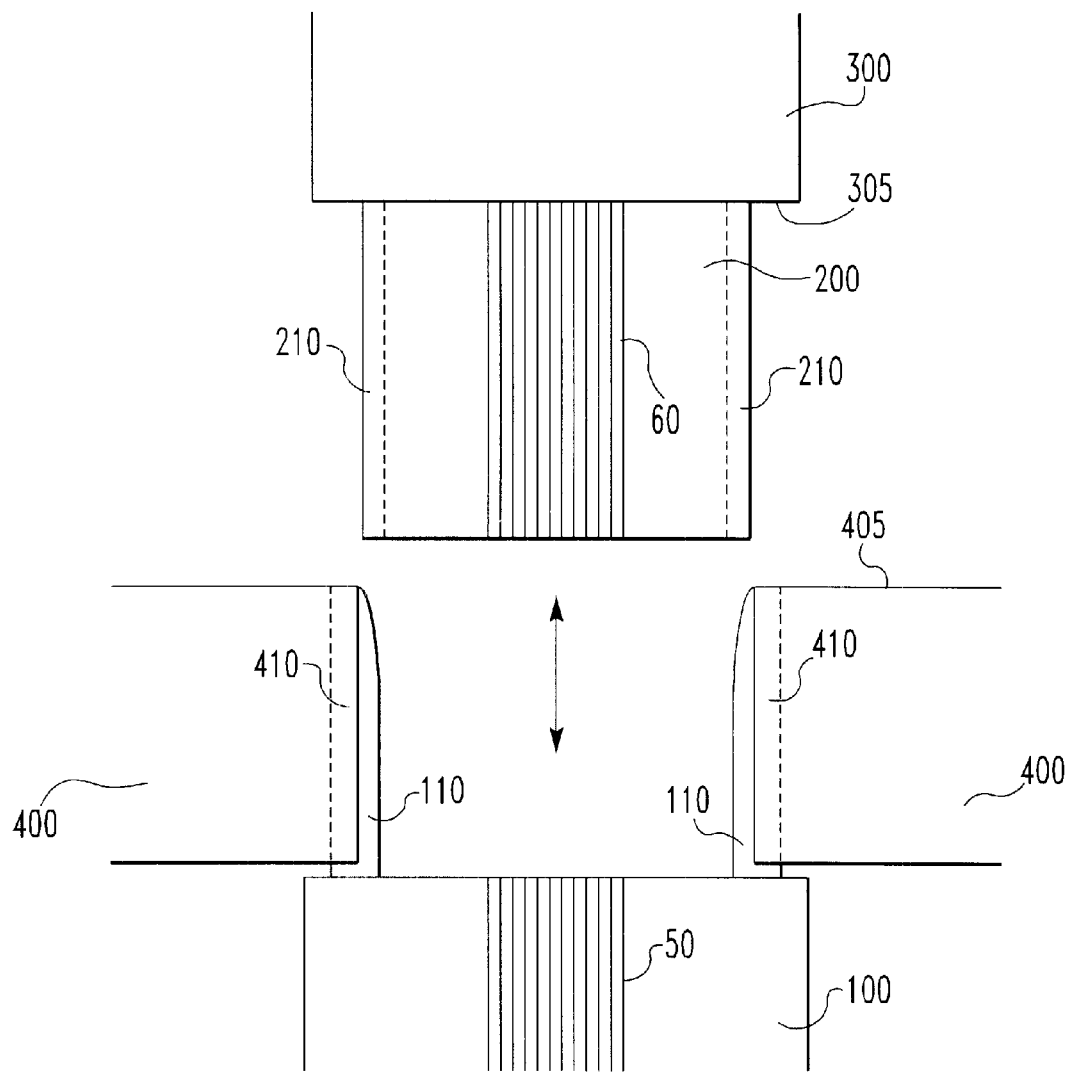
FIG. 12 is an illustration of a passive alignment of a first coupler and a second coupler when a plug is inserted into a receptacle housing in accordance with the present invention.

FIG. 12 illustrates the passive alignment of a first coupler 100 and a second coupler 200 when plug 500 is inserted into the receptacle housing 400. Posts 110 extending from the first coupler 100 abut recessed portions 410 of the receptacle housing 400. When the plug is inserted, a portion of the second coupler 200 extending from the second coupler housing 300 having V-grooves 210 inserts into a region between posts 110. The V-grooves 210 guide the second coupler 200 into passive alignment with the first coupler 100 such that the array 60 of optical fibers of the second coupler 200 is in passive alignment with the array 50 of optical fibers of the first coupler 100. Housing 300 has a surface 305 which can abut surface 405 of receptacle housing 400 and thus control any spacing between the ends of couplers 100 and 200.

Figure 13:
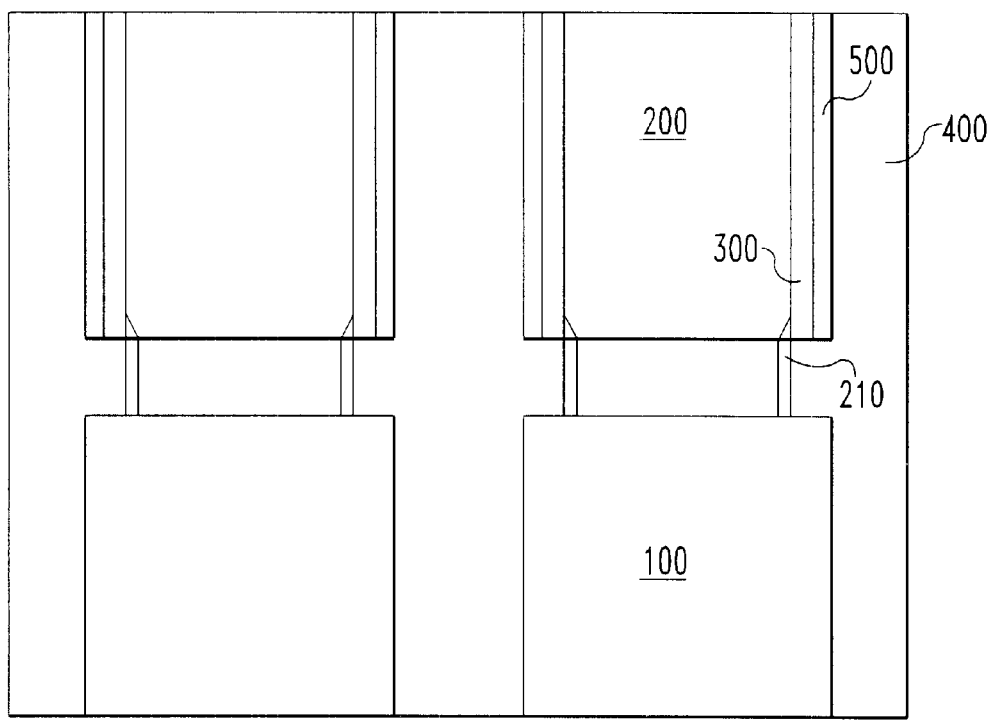
FIG. 13 is a top view illustration of a receptacle housing with a first coupler passively coupled to a second coupler inside the receptacle housing in accordance with the present invention.

FIG. 13 is a top view illustration of a receptacle housing 400 with a first coupler 100 passively coupled to a second coupler 200 inside the receptacle housing in accordance with the present invention. Grooves 210 of the second coupler 200 guide the plug assembly 500 retaining the second coupler housing 300 and second coupler 200, such that the second coupler 200 passively couples with the first coupler 100.

Figure 14:
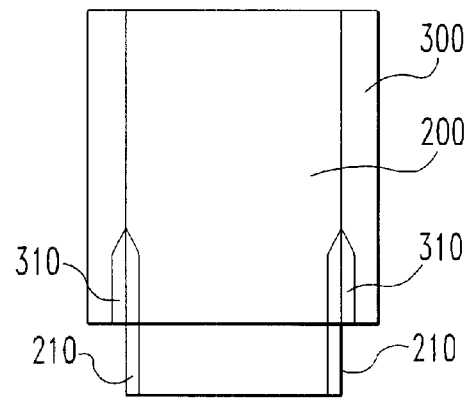
FIG. 14 is an illustration of a second embodiment of a second coupler housing surrounding a second coupler in accordance with the present invention.

FIG. 14 is an illustration of a second embodiment of a second coupler housing 300 surrounding a second coupler 200 in accordance with the present invention. Additionally provided are grooves 310 which can serve to guide the second coupler 200 into passive alignment with the first coupler 100. Grooves 310 can be semicircular, V-shaped, rectangular, or the like.

Figure 15:
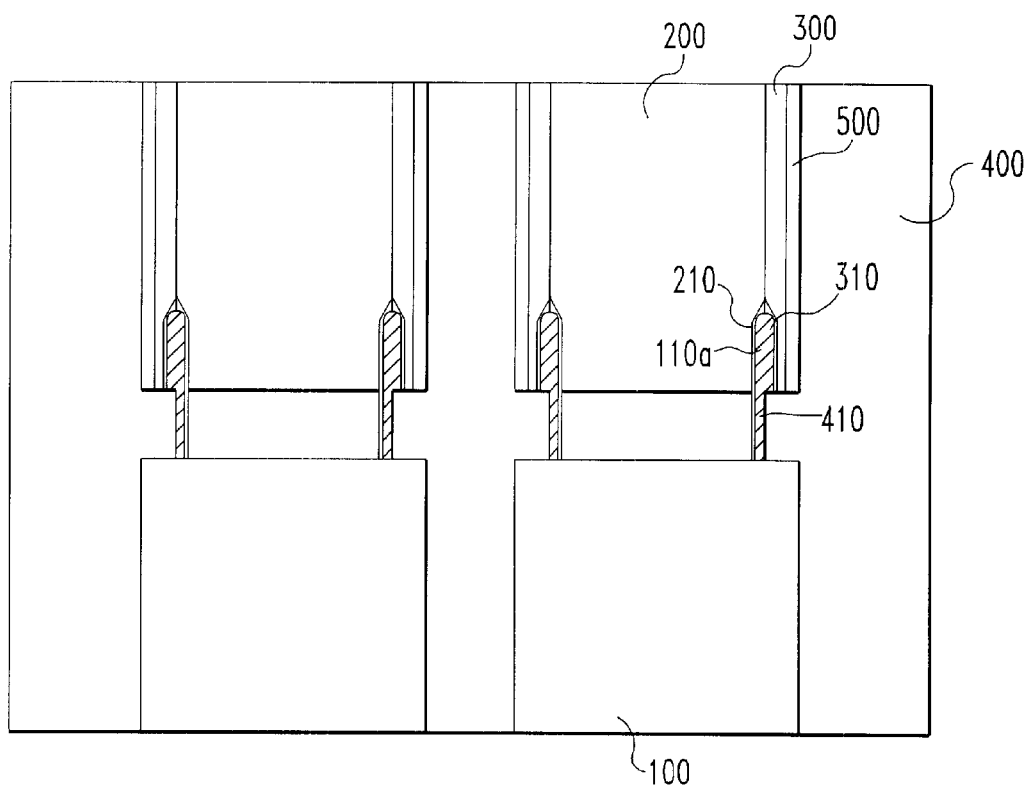
FIG. 15 is an illustration of a receptacle housing showing the passive alignment of a first coupler with a second coupler in accordance with the second embodiment of a second coupler housing and second coupler of the present invention.

FIG. 15 is an illustration of a receptacle housing 400 with a first coupler 100 retained therein for passive alignment with a second embodiment of a second coupler housing 300 and second coupler 200 in accordance with the present invention. As shown, the posts 110a extend from the recessed portions 410 abutting the posts 110a. Grooves 310 of the second coupler housing 300 provide additional support and guidance on the extending portion of posts 110 for the coupling of a first coupler 100 and a second coupler 200.

Figure 16A:
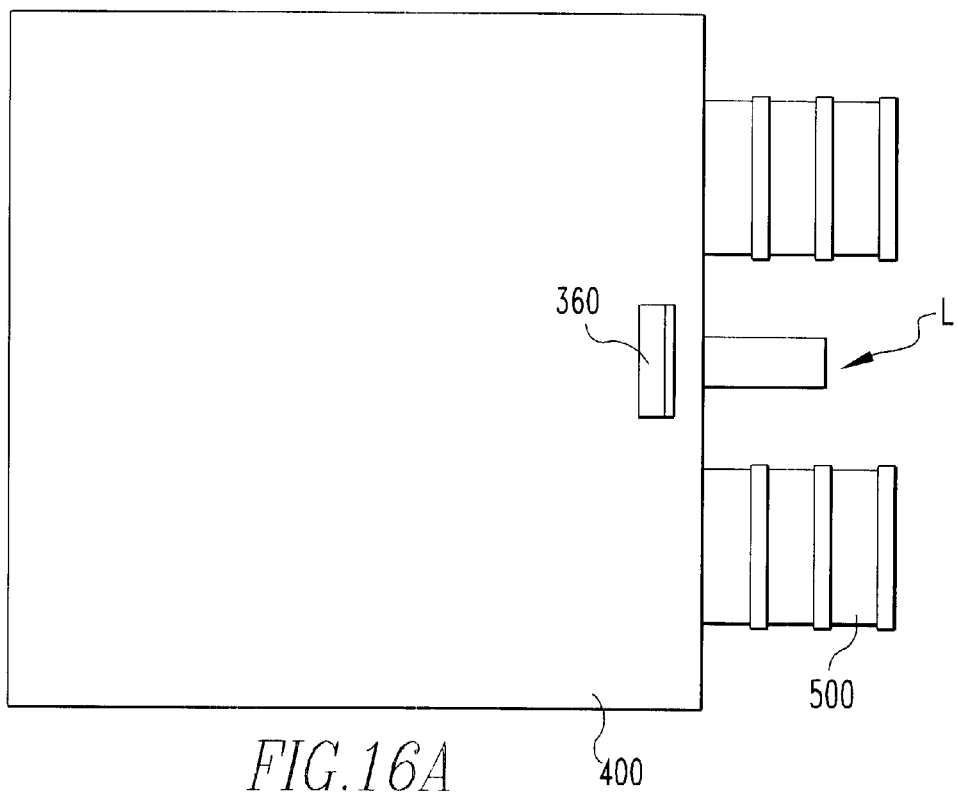
FIGS. 16A and 16B are illustrations of a preferred embodiment of a plug inserted into a receptacle housing in accordance with the present invention.
Figure 16B:
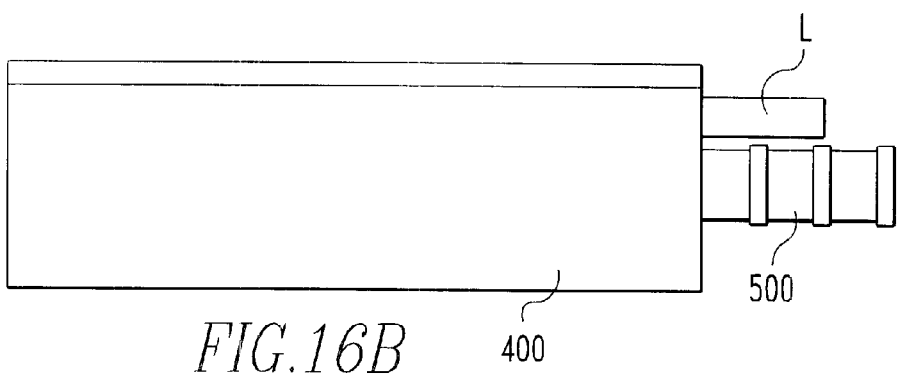

FIGS. 16A and 16B are illustrations of a preferred embodiment of a plug 500 inserted into a receptacle housing 400 and retained therein with latch L in accordance with the present invention. FIG. 16A is a bottom view of the receptacle housing 400 having a plug 500 inserted. A secured position of the plug securing portion 360 is depicted.

Figure 17A:
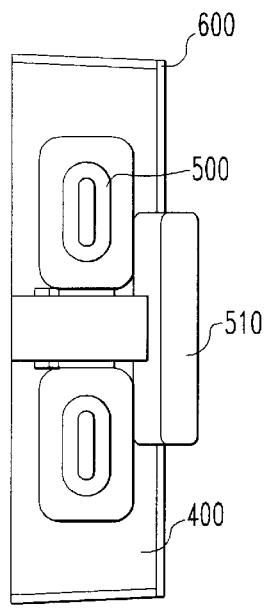
FIGS. 17A through 17C are illustrations of a preferred embodiment of a plug inserted into a receptacle housing having a lift feature portion and an electromagnetic interference shield in accordance with the present invention.
Figure 17B:
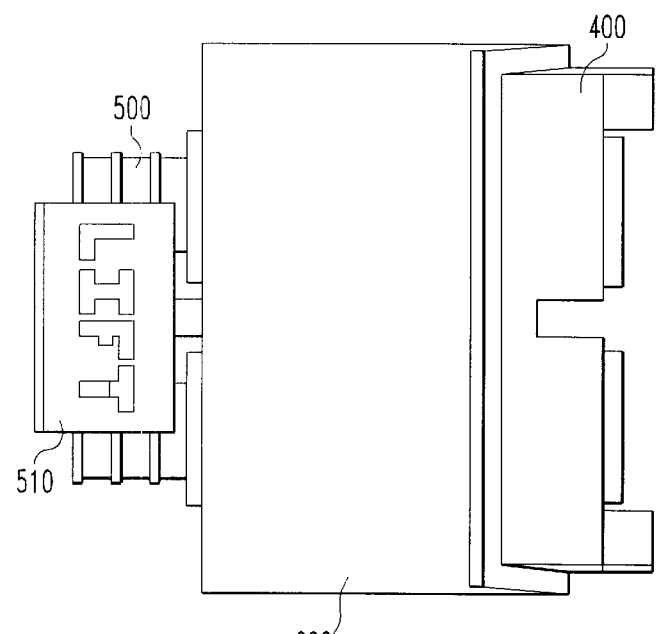
Figure 17C:
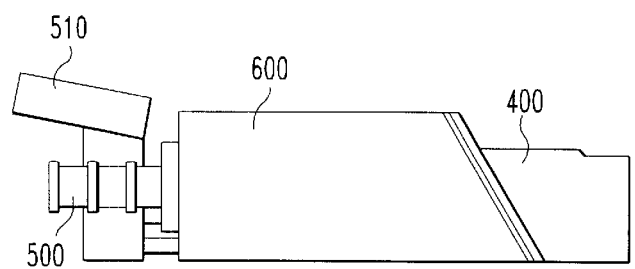

FIGS. 17A through 17C are illustrations of a preferred embodiment of a plug 500 inserted into a receptacle housing 400 having a lift feature portion 510 (for mid-band, as opposed to board edge, applications) and an electromagnetic interference (EMI) shield 600 in accordance with the present invention. The lift feature portion 510 allows a user to lift the portion 510, thereby disengaging the latch L to which lift portion mounts alignment of the first coupler 100 with the second coupler 200. At the same time, a user can exert force in a direction not made difficult by the positioning of the receptacle housing 400 on a printed circuit board, or the like.

Figure 18:
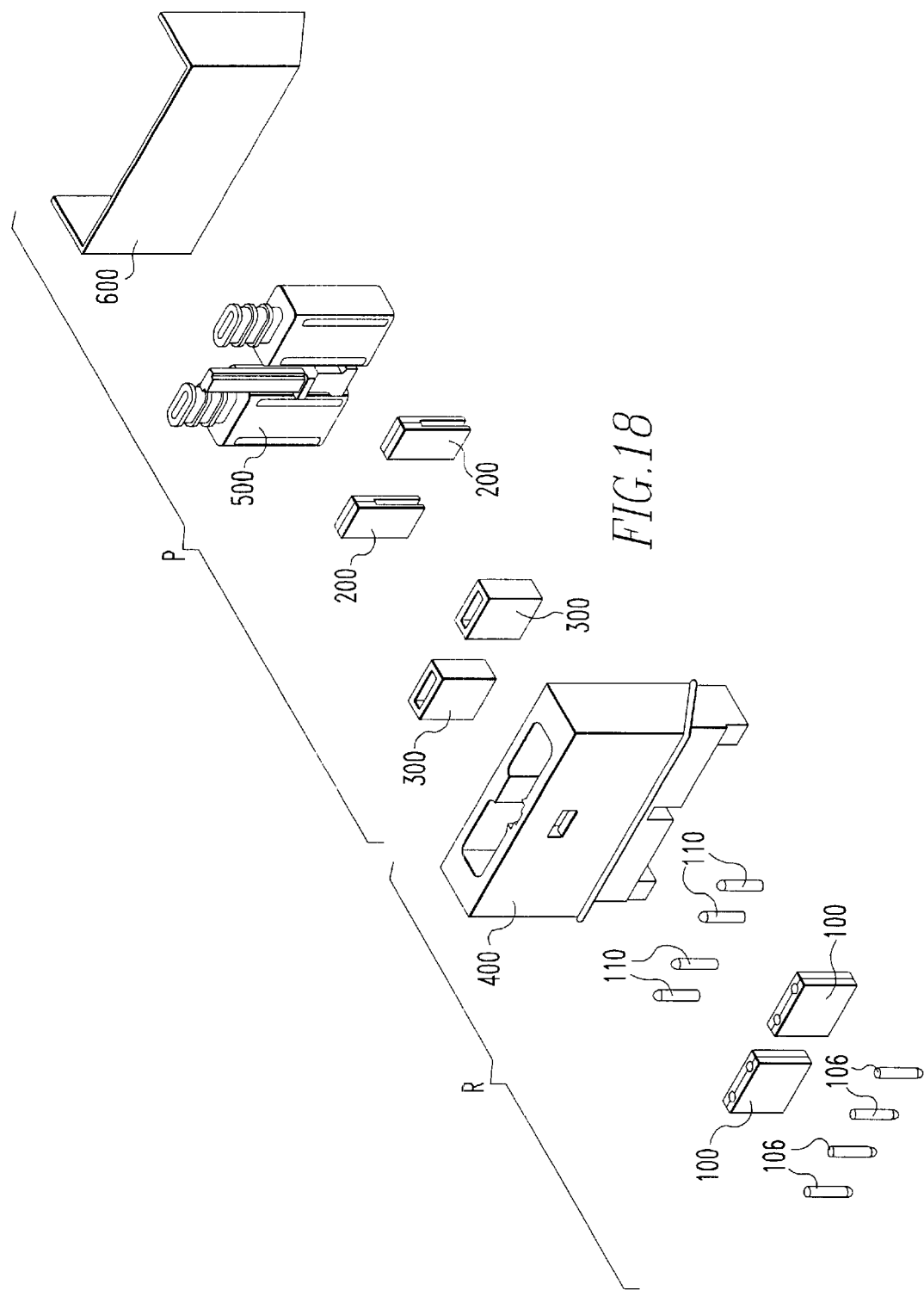
FIG. 18 is an exploded view of a preferred embodiment of the VCSEL or detector to optical fiber plug assembly in accordance with the present invention.

FIG. 18 is an exploded view of a preferred embodiment of an optical fiber receptacle R which actively aligns to the laser component (not shown), such as a VCSEL or detector, to optical fiber plug assembly P in accordance with the present invention. Posts 106 and 110 are inserted into the pair of first couplers 100, which are then actively aligned with laser components in accordance with the active alignment method of the present invention.

The first couplers 100 are then retained inside housing 400. Second coupler housings 300 surround second couplers 200 and are retained in plug 500. Plug 500 can then be inserted into housing 400, thereby passively aligning the first and second couplers 100 and 200, respectively. An EMI shield 600 is placed over top to prevent interference with signal transmission.

Figure 19:
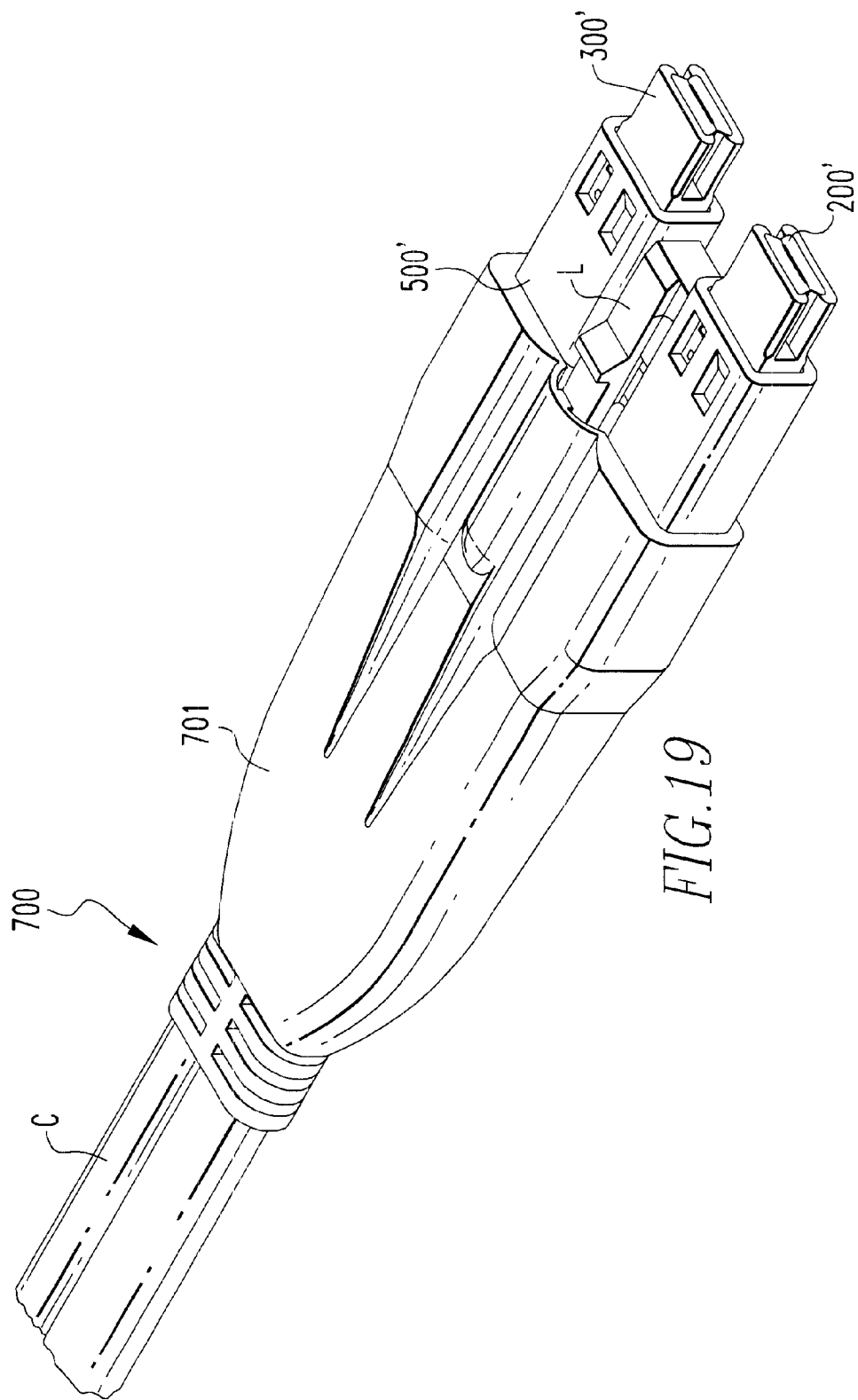
FIG. 19 is a perspective view of an alternative embodiment of the cable assembly of the present invention.

FIG. 19 is a perspective view of an alternative embodiment of the cable assembly of the present invention. Cable assembly 700 includes similar features to the cable assembly described earlier. One difference, however, involves the housing. In cable assembly 700, housing 300' estends to a position flush with the face of second coupler 200'.

In this flush position, housing 300' prevents damage to silicon couplers 200'. FIG. 20 displays a detailed view of the plug portion of cable assembly 700.

A sleeve, or boot 701, surrounds plug 500' and fiber optic cable C. FIG. 21 displays boot 701 with the components removed that are typically inside the boot. Boot 701 prevents damage to plug 500 and acts as a strain relief to cable C. Boot 701 includes a depressible central region 703 to allow operation of latch L.

The method of the invention actively aligns an array of laser components, such as an array of VCSELs or laser detectors to a light transport terminal having an array of optical fibers sandwiched in the terminal, such as a ferrule. The method is achieved by passively aligning an array of laser components to a first light transport terminal by way of posts extending from the first light transport terminal into a housing for the laser components.

A first estimate is provided for aligning the array of laser components to the array of optical fibers of the first light transport terminal. The array of laser components are now ready to be actively aligned.

An aligning machine is employed for moving the array of laser components relative to the array of optical fibers for active alignment. In accordance with the method of the present invention, first one end laser component is aligned with the corresponding end optical fiber by first aligning the position along an X-axis and then the position along a Y-axis, perpendicular to the X-axis. One end laser component is thereby aligned. The other end laser component is aligned with the corresponding optical fiber by aligning the position along an arc defined by a circle having a center of the first end laser component, and a radius of the distance spanned by the two end laser components. The two end laser components are thereby aligned with the corresponding optical fibers and the laser components in between the two end laser components are also aligned as a result. Once aligned, the array of laser components is then securely fixed to the array of optical fibers.

The first light transport terminal, having one end now aligned with the array of laser components is inserted and secured into a shaped receptacle housing having a complementary shape formed at the end of the receptacle housing for receiving the first light transport terminal. Two additional posts, extending from the first light transport terminal towards the receptacle housing, partially rest in semicircular grooves formed in the body of the receptacle housing.

A second light transport terminal is also provided. The second light transport terminal has two constituent elements that also sandwich an array of optical fibers and has a surface for aligning the array of optical fibers to the array of optical fibers of the first light transport terminal. In particular, constituent elements each have a tapered portion such that when the constituent elements of the second light transport terminal are placed together, grooves are formed. A rectangular second light transport terminal housing is placed around the second light transport terminal, allowing a portion of the second light transport terminal to extend therefrom.

A plug is provided for providing retention force for retaining the second light transport terminal and the second light transport terminal housing. When the plug is inserted into the receptacle housing, the optical fibers of the first light transport terminal and the optical fibers of the second light transport terminal passively align via the posts extending from the first light transport terminal abutting the grooves of the second light transport terminal. An electromagnetic interference shield can be placed around the plug/receptacle housing mating assembly for preventing interference with the signal carried on the optical fibers. In accordance with the present invention, the receptacle housing can be secured onto a printed circuit board or the like.

The present invention thus provides an improved assembly for the alignment of laser components to laser transport terminals, and a method for actively aligning laser components to laser transport terminals.

While the present invention has been described in connection with the preferred embodiments of the various figures, it is to be understood that other similar embodiments may be used or modifications and additions may be made to the described embodiment for performing the same function of the present invention without deviating therefrom. It will be appreciated by those of ordinary skill in the art that the description given herein with respect to those Figures is for exemplary purposes only and is not intended in any way to limit the scope of the invention.

For example, while dual channeled silicon couplers having an array of twelve optical fibers have been referenced, it can be appreciated by one of skill in the art that variations on the composition and number of couplers and variations in the number of fibers can still be implemented in accordance with the present invention. In addition, while portions of the disclosure have addressed securing via an adhesive, any number of alternative securing means can be employed, such as screws, interlocking means, and the like. Therefore, the present invention should not be limited to any single embodiment, but rather construed in breadth and scope in accordance with the recitation of the appended claims.

What is claimed is:

1. An optical fiber light transport terminal, comprising:
   a first half, including:
   a first face and second face;
   a first array of V-grooves, substantially perpendicular to said first face of said first half;
   a first pair of post grooves extending inward from said first face of said first half; and
   a first pair of post grooves extending inward from said second face of said first half;
   a second half, including:
   a first and second face;
   a second array of V-grooves, substantially perpendicular to said first face of said second half;
   a second pair of post grooves extending inward from said first face of said second half; and
   a second pair of post grooves extending inward from said second face of said second half;
   an array of optical fibers sandwiched by said first and second arrays of V-grooves; and
   securing means for mechanically coupling said first and second halves.

2. An optical fiber light transport terminal according to claim 1, wherein said first pair of post grooves extending inward from said first face of said first half line up with said first pair of post grooves extending inward from said first face of said second half forming a first pair of passageways, and said second pair of post grooves extending inward from said second face of said first half line up with said second pair of post grooves of said second face of said second half forming a second pair of passageways.

3. An optical fiber light transport terminal according to claim 1, wherein said securing means is an adhesive.

4. An optical fiber light transport terminal according to claim 1, wherein said first faces of said first and second halves, and said second faces of said first and second halves are polished.

5. An optical fiber light transport terminal according to claim 2, further comprising:
- a first pair of posts inserted into said first pair of passageways; and
- a second pair of posts inserted into said second pair of passageways.

6. An optical fiber light transport terminal according to claim 5, wherein said first and second pairs of posts are secured in said first and second pair of passageways with an adhesive.

* * * * *